Oct. 13, 1970  R. G. ZOEBELEIN  3,533,200
PREFABRICATED ROOM ASSEMBLY
Filed Aug. 29, 1967

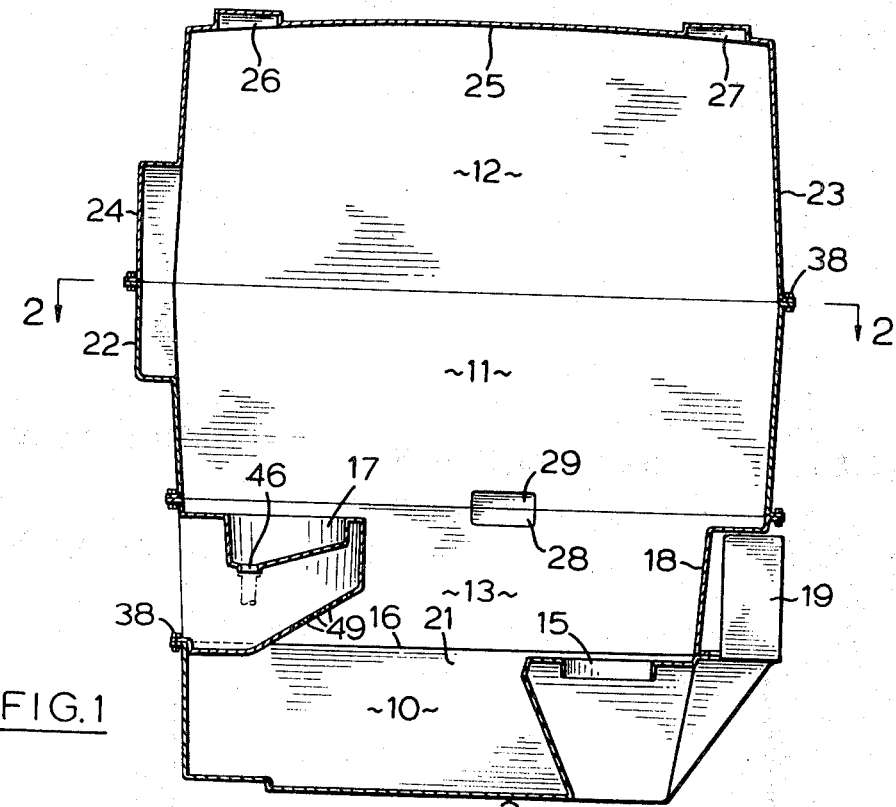
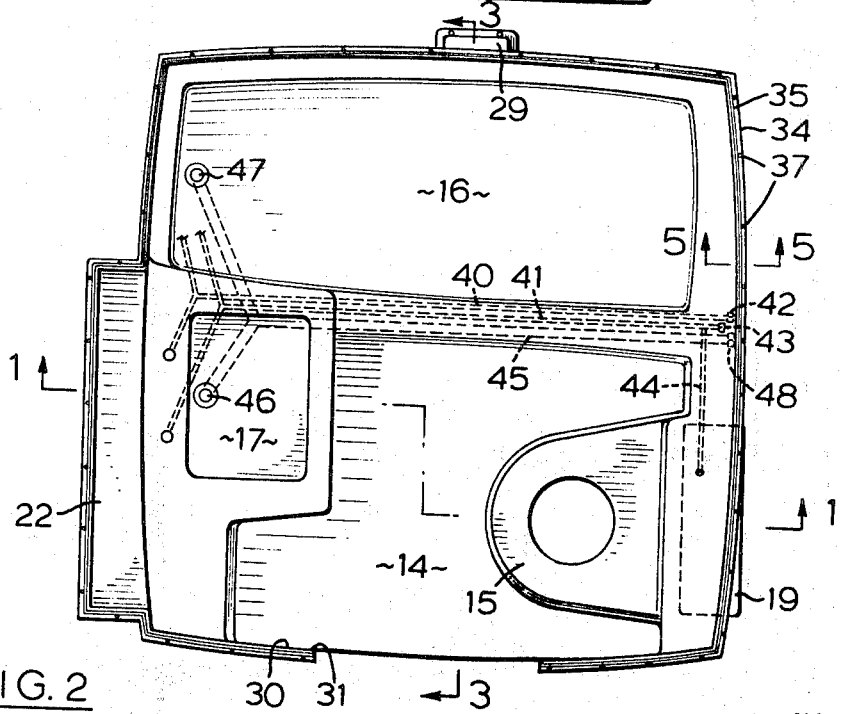

INVENTOR.
ROBERT GEORGE ZOEBELEIN
BY Maybee & Legris
ATTORNEYS

Oct. 13, 1970  R. G. ZOEBELEIN  3,533,200
PREFABRICATED ROOM ASSEMBLY
Filed Aug. 29, 1967  5 Sheets-Sheet 3

INVENTOR.
ROBERT GEORGE ZOEBELEIN
BY Maybee & Legris
ATTORNEYS

Oct. 13, 1970  R. G. ZOEBELEIN  3,533,200

PREFABRICATED ROOM ASSEMBLY

Filed Aug. 29, 1967  5 Sheets-Sheet 4

INVENTOR.
ROBERT GEORGE ZOEBELEIN
BY Maybee & Legris
ATTORNEYS

INVENTOR.
ROBERT GEORGE ZOEBELEIN
BY Maybee & Legris
ATTORNEYS

United States Patent Office 3,533,200
Patented Oct. 13, 1970

3,533,200
PREFABRICATED ROOM ASSEMBLY
Robert George Zoebelein, Toronto, Ontario, Canada, assignor to Crane Canada Limited, Quebec, Quebec, Canada, a corporation of Canada
Filed Aug. 29, 1967, Ser. No. 664,069
Claims priority, application Great Britain, Nov. 1, 1966, 48,912/66
Int. Cl. A47k 4/00; E04c 2/20
U.S. Cl. 52—35       22 Claims

ABSTRACT OF THE DISCLOSURE

The following disclosure is directed to a stackable, pre-fabricated room assembly, such as a bathroom assembly, the assembly comprising two or more sections which, when the room assembly is in the assembled condition, are disposed in superposed relationship and which, when the assembly is in the stacked condition, are disposed with the section or at least one of the sections, other than the lower section, around this lower section, said at least one section other than the lower section being slightly resilient and being discontinuous by, for example, having a vertically disposed door opening traversing the full height thereof. There may be an upper section which includes the ceiling of the room, in which case this upper section, when the assembly is in the stacked condition, is inverted and the lower section is disposed therein. Where there is more than one section apart from the lower and upper sections, one or more of these sections may, when the assembly is in the stacked condition, be disposed between the lower and upper sections with the remaining section or sections disposed around the upper section.

At least one room facility, as hereinafter defined, is integrally formed with the lower section although there may, in addition, be a further room facility or facilities which are removably mounted to one or more of the sections.

There may, furthermore, be at least one further section which is disposed in superposed relationship with one of the above-mentioned sections both when the room assembly is in the assembled condition and when it is in the stacked condition.

BACKGROUND OF THE INVENTION

Field of invention

There have hitherto been used pre-fabricated room assemblies each of which comprises a plurality of sections, the sections being adapted to be so interfitted as to constitute at least part of a complete room and including at least part of the walls of the room together with one or more room facilities. In some cases the sections have been such that, when interfitted, they constitute a complete room in which case, in addition to one or more room facilities, there has been included the walls in their entirety together with the floor and ceiling of the room. The room facility, or at least one of said facilities where there is a plurality thereof, has, in certain instances, been integrally formed with one or more of the sections.

These known constructions have, however, suffered from the disadvantage that the sections have been of such form and configuration that, prior to assembly of the sections, the sections could not readily be stacked in such a manner as to occupy a space substantially less than the space occupied by the room assembly when in the assembled condition. The result has been that the transportation and storage costs of such pre-fabricated room assemblies have been considerable and have considerably increased the cost of such room assemblies to the customer. This disadvantage has been aggravated by the fact that the manufacture of such room assemblies requires a considerable capital outlay on production equipment so that economic production necessitates production on a large scale. Thus production requires to be centralised to a considerable extent so that transportation of the room assemblies from the factory to the sites where the assemblies are to be installed is an important factor in the cost of the assemblies.

It is a primary object of the present invention to obviate or mitigate the above disadvantage by providing a pre-fabricated room assembly of the above-described type which is of such construction that the sections, prior to assembly, can be so stacked relative to one another that the sections constituting the assembly occupy a space which is considerably less than the space occupied by the sections when assembled.

It is to be understood that there is included within the scope of the term "room facility" as used herein any feature or structure which is usually disposed within a room. For example, where the room is a bathroom the term "room facility" includes a bath tub, a shower tub, a foot bath, a hip bath, a wash hand basin and a W.C. bowl. Again by way of example, where the room is a kitchen the term "room facility" includes a sink, cupboards and each of the other structures which are usually disposed within a kitchen while, similarly, where the room is, for example, a sauna bath the term "room facility" includes each of the structures which are usually disposed within a sauna bath.

It is also to be understood that the term "room assembly" when hereinafter used in relation to a bathroom is not to be construed as being restricted to a room, or a part of a room, which necessarily incorporates a bath tub but is to be construed as including a room, or a part of a room, incorporating any one or more of the above-mentioned room facilities which are usually disposed within a bathroom.

DESCRIPTION OF PRIOR ART

The most relevant prior art of which the inventor is aware is U.S. Pats. Nos. 3,047,106 to Callahan, 3,110,907 to King and 3,148,380 to Hanson. Of these prior patents the most pertitnent is probably that to Hanson.

The construction of Hanson is disclosed as being stackable but it should be noted that with the room facilities installed in the shells of the Hanson construction, these shells would clearly not be stackable whereas according to the present invention at least one room facility is integrally formed with the lower section and the sections are completely stackable.

Furthermore, according to the construction of Hanson the shells forming the bathroom units are interconnected about vertical joints whereas, of course, according to the present invention the sections constituting the room assembly are interconnected about substantially horizontal joints since the various sections, when the room assembly is in the assembled condition, are disposed in superposed relationship. In addition, the feature of the present invention by which the section or at least one of the sections, other than the lower section, is discontinuous and is resiliently deformable for disposal thereof around the lower section when the sections are in the stacked condition has no equivalent in the construction of Hanson.

While the constructions disclosed by Callahan and King may be referred to as being stackable these constructions are clearly not stackable in the sense in which the present invention is stackable.

SUMMARY OF THE INVENTION

A stackable, pre-fabricated room assembly according to the invention comprises at least two sections one of which constitutes a lower section, the sections being adapted to be assembled in superposed relationship. At least one of the sections includes a room facility integrally formed therewith, and at least one of the sections, other than the lower section, is discontinuous and is of open-ended resiliently deformable construction. At least one of the remaining sections, including the lower section, has external dimensions which exceed the corresponding internal dimensions of the discontinuous section or sections when not resiliently deformed. These internal dimensions of the discontinuous section or sections are capable of being increased for resilient deformation of the discontinuous section or sections by disposal thereof around the remaining section or sections when all the sections are in the stacked condition.

In one preferred embodiment of the invention there are at least four sections including or consisting of, in addition to the lower section, at least one intermediate section, an upper section and at least one further section, the lower intermediate and upper sections being adapted to be assembled in superposed relationship, and the further section and one of the sections consisting of the lower, intermediate, and upper sections being disposed in superposed relationship and having a combined height substantially equal to the height of each of the remaining sections. The lower section includes the floor of the room, the lower portions of the walls of the room and the above-mentioned at least one room facility, and the upper section includes the ceiling and the upper portions of the walls of the room. The internal dimensions of the upper section relative to the corresponding external dimensions of the lower section are such that the lower section may be disposed within the upper section with the upper section in the inverted condition. Furthermore, in this preferred embodiment a vertically disposed door opening is formed in one of the walls of the room, and traverses the full height of the intermediate and said further sections so that the intermediate section or sections are of open-ended, discontinuous construction. The intermediate section or sections are resiliently deformable, and the upper section has external dimensions which exceed the corresponding internal dimensions of the discontinuous intermediate section or sections when not resiliently deformed. These internal dimensions of the discontinuous intermediate section or sections are capable of being increased by resilient deformation of the discontinuous intermediate section or sections for disposal thereof around the upper section with the lower and upper sections in the stacked condition. The further section is of such dimensions or form that it may be disposed in the same manner as the section with which it is in superposed relationship.

According, alternatively, to a second embodiment of the invention there are merely at least two sections, one of which constitutes the lower section, this lower section being of the form described above with reference to the lower section of the first preferred embodiment. In the second preferred embodiment the remaining section or sections include portions of the walls of the room above said lower portions thereof, and, in a similar manner to the first preferred embodiment, a vertically disposed door opening is formed in one of the walls of the room and traverses the full height of said remaining section or sections so that said remaining section or sections are of open-discontinuous construction. Said remaining section or sections are also resiliently deformable, and the lower section has external dimensions which exceed the corresponding internal dimensions of the discontinuous section or sections when not resiliently deformed. These internal dimensions of the discontinuous section or sections are capable of being increased by resilient deformation of the discontinuous section or sections for disposal thereof around the lower section when all the sections are in the stacked condition.

As a further alternative, in a third preferred embodiment of the invention the further section of the first preferred embodiment may be omitted so that in this third preferred embodiment there are merely at least three sections, namely a lower section, at least one intermediate section, and an upper section. With the above exception this third preferred embodiment of the invention is of the same form as the above-described first preferred embodiment.

As a still further alternative there are, in a fourth embodiment of the invention, at least two sections one of which constitutes the lower section, this lower section including the above-mentioned at least one room facility and the remaining section or sections being of discontinuous, open-ended construction and including those parts of portions of the walls of the room adjacent to the room facility. Said remaining section or sections are resiliently deformable, and the lower section has external dimensions which exceed the corresponding internal dimensions of the discontinuous section or sections when not resiliently deformed. These internal dimensions of the discontinuous section or sections are capable of being increased by resilient deformation of the discontinuous section or sections for disposal thereof around the lower section when all the sections are in the stacked condition.

With reference to all the embodiments of the invention the sections are preferably each of integral construction, at least one of the sections, and in the case of the first and third embodiments preferably at least the intermediate section or sections, being, formed, for example, from an appropriate plastic or steel. More specifically, said section or sections may, for example, be of molded fibreglass construction.

All the sections may be formed from an appropriate plastic or steel and may, more specifically, be of molded fibreglass construction. A colouring agent or agents may be included during manufacture where the sections are of molded fibreglass construction or are otherwise formed from an appropriate plastic.

The further section or sections included in the first preferred embodiment may be included in any or all of the remaining embodiments of the invention, said at least one further section and one of the sections hereinbefore referred to in relation to the second, third, and fourth embodiments being disposed, as in the case of the first preferred embodiment, in superposed relationship when the room assembly is both in the stacked and in the assembled condition and having a combined height substantially equal to the height of each of the remaining sections. The result of incorporating at least one such further section is that one or more of the sections are, in effect, each formed as at least two sub-sections, these sub-sections being constituted by the further section or sections and the section disposed in superposed relationship therewith both when the assembly is in the stacked and in the assembled condition.

The incorporation of at least one further section as defined in the last preceding paragraph may facilitate the manufacture of the room assembly since, for example, where the lower section and at least one further section are in superposed relationship both when the assembly is in the stacked and in the assembled condition and the lower section is of molded construction the manufacture of the lower section using a reduced number of mold parts may be possible.

A further room facility may, with reference to all the embodiments, be included in the assembly, this further facility being adapted to be removably mounted to at least one of the sections and being disposable within the space bounded by the lower section so that with the assembly in the stacked condition and the further facility disposed within the space bounded by the lower section the further facility does not increase the overall dimensions of the stacked assembly. Where the assembly, referring again to all the embodiments, is a bathroom assembly the above further facility may, for example, be constituted by a wash hand basin.

Still referring to all the embodiments, a joint is preferably provided between adjacent edges of adjacent ones of the sections, the joint being constituted by a tongue projecting from one of said adjacent edges and a mating groove formed in the other of said adjacent edges. A caulking strip may be provided between the tongue and the groove, the groove being filled with the strip which, when said adjacent ones of the sections are assembled in superposed relationship, is forced by the tongue between the adjacent edges of the sections for sealing purposes. Preferably when the sections are assembled the tongue substantially prevents water leakage between said sections from the interior of the assembly.

Where the assembly is, for example, a bathroom assembly all plumbing fixtures, piping and connections and all electrical wiring mounted within the assembly may be installed in the appropriate sections prior to the despatch of the stacked sections from the factory so that during the on-site assembly and installation of the assembly, the plumbing and electrical wiring connections merely require to be coupled to the appropriate service connections in the building. The assembly may incorporate a room facility, such as a bath tub, which includes a wall of hollow construction disposed between opposed portions of the bathroom walls, in which case service piping, which term includes, for example, electrical conduit as well as piping associated with the bathroom plumbing, may be disposed through this wall of hollow construction thereby, for example, permitting the location, if desired, of room facilities, such as a wash hand basin and a W.C. bowl, on opposed portions of the bathroom walls. Such an arrangement is only possible in conventional custom built bathrooms if the service piping is disposed through the floor or ceiling supporting beams from one side of the bathroom to the other and this, of course, greatly increases the cost of building the bathroom.

To, for example, facilitate the coupling of piping and electrical wiring connections to the appropriate services in the building during on-site assembly and installation of the room assembly and to facilitate subsequent inspection, repair and replacement of this piping and electrical wiring and of the plumbing fixtures there may be provided a removable panel or panels which cover an opening or openings formed in one or more of the sections. The, or each, panel may be formed of the same material as the sections and may be removably attached by means, for example, of strips of attachment material such as that marketed under the trade name Velcro.

BRIEF DESCRIPTION OF THE DRAWINGS

In order that the invention may be more clearly understood the same will now, by way of example, be described more fully with reference to the accompanying drawings which illustrate prefabricated room assemblies according to the four preferred embodiments of the invention hereinbefore described, the room assemblies being in all cases bathroom assemblies. In the drawings:

FIG. 1 is a sectional view of the first embodiment showing the bathroom assembly on the line 1—1 of FIG. 2, the assembly being shown in the assembled condition;

FIG. 2 is a sectioned view of the bathroom assembly shown in FIG. 1, on the line 2—2 of FIG. 1;

Figure 3:
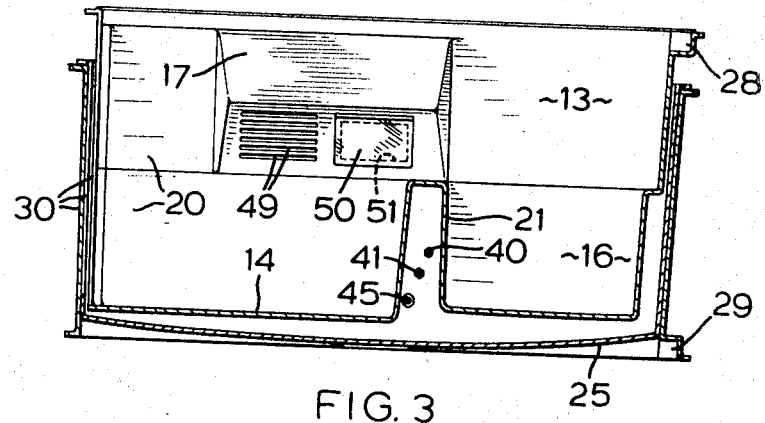
FIG. 3 is a sectioned view of the bathroom assembly shown in FIG. 1 on the line 3—3 of FIG. 2, the assembly being shown in the stacked condition.

Like parts are denoted by like reference numerals throughout all the figures of the drawings. Furthermore, in FIGS. 4, 8, 11 and 14 the assemblies are, for clarity, shown in a slightly exploded condition although, as will be understood, the adjacent sections, when the assemblies are in the stacked condition shown in these figures, will be in contact.

DESCRIPTION OF THE PREFERRED EMBODIMENTS

Referring particularly to the first embodiment of the invention illustrated in FIGS. 1 to 5 inclusive of the drawings, 10 denotes a lower section, 11 denotes an intermediate section, and 12 denotes an upper section. 13 denotes a further section disposed in superposed relationship with the lower section 10, the combined height of the sections 10 and 13 being substantially equal to the height of each of the remaining sections 11 and 12. It is to be understood that instead of being disposed in superposed relationship with the lower section 10 the further section 13 may be so disposed relative to either the section 11 or the section 12 in which case the combined height of the sections 11 and 13 is substantially equal to the heights of each of the sections 10 and 12 or the combined height of the sections 12 and 13 is substantially equal to the heights of each of the sections 10 and 11, respectively. Furthermore, there may be more than one such further section 13.

Each of the sections 10, 11, 12 and 13 is integrally formed of an appropriate plastic or steel, the sections being, for example, of molded fibreglass construction. The molded fibreglass is formed, as in conventional practice, of chopped fibreglass matting bonded by a polyester resin. A colouring agent or agents may be added, as desired, during the molding of the sections 10, 11, 12 and 13.

The section 10 is molded to include the bathroom floor 14 together with two room facilities consisting of a W.C. bowl 15 and a bathtub 16. It is to be understood that the section 10 may include only one room facility The further section 13 is molded to include a wash hand basin 17 and a projecting casing 18 for a flushing water cistern 19 associated with the W.C. bowl 15. The sections 10 and 13 are also molded to include the lower portions 20 of the bathroom walls, the bathtub 16 being defined on three sides by the lower portions 20 of the bathroom walls included in the section 10 and being defined on the fourth side by a wall 21 disposed between opposed portions of the bathroom walls. The wall 21 is of hollow construction.

The intermediate section 11, which is discontinuous and of open-ended construction, is molded to include the intermediate portions of the bathroom walls together with the lower portion 22 of a recess which is intended to house a medicine cabinet (not shown).

The upper section 12 is molded to include the upper portions 23 of the bathroom walls together with the upper portion 24 of the recess within which the medicine cabinet is intended to be housed. Also molded as a part of the section 12 is the bathroom ceiling 25 in which ports 26, 27 are integrally formed, the port 26 being intended to house a light fitting by which the interior of the bathroom may be illuminated when in use, and the port 27 being intended to house a ventilation fitting for ventilating the interior of the bathroom when in use.

In addition, the further section 13 includes, as a part molded therein, the lower portion 28 of a soap tray and grab rail disposed on one of the bathroom walls above the bathtub 16 and the intermediate section 11 includes, as a part molded therein, the upper portion 29 of this soap tray and grab rail.

When the bathroom is assembled the bathroom wall indicated by the reference 30 is substantially vertical. A door opening 31 is formed in this wall 30, the opening 31 extending between the bathroom ceiling 25, and the bathroom floor 14 so that the lower portion of the opening 31 is formed in the lower section 10 and in the further section 13, the intermediate portion of the opening 31 is formed in the intermediate portion 11, and the upper portion of the opening 31 is formed in the upper portion 12. The intermediate portion of the opening 31 traverses, of course, the full height of the intermediate portion 11 and constitutes the discontinuity in the portion 11. A sliding door which does not form part of this invention and is not illustrated is, when the bathroom is assembeld, suspended from rollers which run on a roller track mounted on the upper section 12 above the door opening 31. A batten (not shown) which may be conveniently formed of wood is secured, as by glueing, to the external face of the upper section 12 above the door opening 31, the batten facilitating mounting of the roller track which is intended to be secured, for example by screws, to the batten. Similarly, further battens (not shown) which may again conveniently be formed of wood are secured, by, for example, glueing, to the external faces of the sections 10, 11, 12 and 13 bounding the side edges of the door opening 31. When the bathroom is assembled as hereinbefore described vertical door frame members (not shown) are secured, by, for example, screws, to the further battens, the door frame members serving also to increase the rigidity of the assembled bathroom since they interconnect the sections 10, 11, 12, 13.

In the upper section 12 the portions 23 of the opposed bathroom walls are slightly divergent in the direction from the bathroom ceiling 25 thereby to facilitate separation of the mold parts during molding of the section. For the same reason in the sections 10, 13 the portions 20 of the opposed bathroom walls are slightly divergent in the direction from the bathroom floor 14.

The internal length and breadth dimensions of the upper section 12 relative to the corresponding external dimensions of the lower and further sections 10, 13 are such that the lower and further sections 10, 13 may be disposed within the upper section 12 when the bathroom assembly is stacked as described below. In addition, the length and breadth of the open upper face of the further section 13 remote from the bathroom floor 14 are less than the coresponding dimensions of the open lower face of the upper section 12 remote from the bathroom ceiling 25 so that the intermediate portions of the opposed bathroom walls included in the section 11 are thus slightly divergent in the direction from the further section 13 towards the upper section 12 considered with the bathroom assembly in the assembled condition. This slight divergence of the opposed intermediate portions of the bathroom walls also facilitates the separation of the mold parts during the molding of the section 11.

Figure 5:
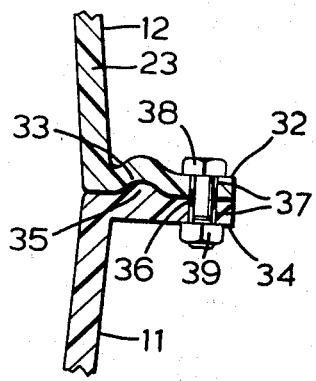
FIG. 5 is an enlarged sectioned view, on the line 5—5 of FIG. 2, of part of the bathroom assembly shown in FIG. 1.

With specific reference to FIG. 5 the lower face of the upper section 12 remote from the bathroom ceiling 25 is integrally provided with an outwardly projecting flange 32 formed with a groove 33. Likewise the upper face of the intermediate section 11 is integrally provided with an outwardly projecting flange 34 from which a tongue 35 upwardly projects, the flanges 32, 34 being, when the bathroom is assembled, in mating alignment with the tongue 35 disposed within the groove 33.

A caulking strip 36 is provided between the tongue 35 and the groove 33, the strip 36 being, prior to assembly of the bathrom assembly, disposed within the groove 33 so that, when the bathroom assembly is assembled, the strip 36 is forced by the tongue 35 between the flanges 32, 34 thereby to seal the joint as shown in FIG. 5.

Vertically aligned holes 37 are formed at spaced intervals in the flanges 32, 33, a bolt 38 being passed through each pair of aligned holes 37 when the bathroom has been assembled and a nut 39 being tightened thereon to secure the sections 11, 12 together.

A form of joint identical to that described above may be provided between the adjacent edges of the sections 10, 13 and between the edges of the further section 13 and the intermediate section 11 which are adjacent when the bathroom assembly is assembled. Since the tongue 35 projects upwardly any tendency for water to leak through the joint from the interior of the bathroom assembly when in use is substantially overcome.

Service piping, such as hot and cold water piping 40, 41, respectively, is disposed within the wall 21 of hollow construction and connects the hot and cold water tap fixtures (not shown) associated with the wash hand basin 17 and bath tub 16 to coupling connections 42 and 43, respectively. A branch pipe 44 from the cold water piping 41 is connected to the cistern 19 associated with the W.C. bowl 15. Waste piping 45 connects the drains 46 and 47 in the wash hand basin and bath tub, respectively, with a coupling connection 48. A separate waste pipe (not shown) connects the waste outlet from the W.C. bowl 15 to a further coupling connection.

49 indicates a grille through which warm air may be supplied to the interior of the bathroom assembly when in use, the grille being mounted on a duct (not shown) which is provided with a still further coupling connection.

At least one fibreglass panel 50 is removably attached, for example by strips of attachment maerial such as that marketed under the trade name Velcro, over an opening 51 formed in the further section 13 thereby to cover the opening 51. As will be appreciated, the opening 51 may be formed in a section or sections other than the further section 13 and where there is more than one such opening the openings may be formed in, in addition to the further section 13, sections other than the section 13.

The opening or openings 51 permit access to the coupling connections during installation of the bathroom assembly and also facilitate inspection, repair and replacement of any of the plumbing fixtures or service piping.

Figure 4:
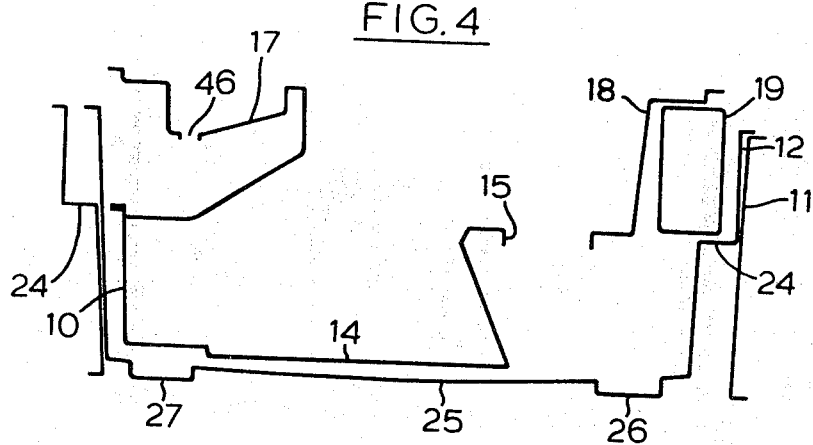
FIG. 4 is a sectioned diagrammatic view of the bathroom assembly shown in FIG. 1 on the line 1—1 of FIG. 2, the assembly again being shown in the stacked condition.

During storage or transportation of the bathroom assembly, prior to assembly thereof, the assembly is stacked in the manner illustrated in FIGS. 3 and 4. To stack the assembly the upper section 12 is inverted and the superposed lower and further sections 10, 13 are disposed therein, the upper portion 24 of the recess for the medicine cabinet being so positioned that the water cistern 19 is disposed therein as is shown in FIG. 4. The internal length and breadth of the intermediate section 11 are then, by resilient deformation of this section 11, increased sufficiently for this section 11 to be disposed around the inverted upper section 12, this deformation of the section 11, which results in a slight increase in the width of the intermediate portion of the door opening 31, being, of course, permitted by this intermediate portion of the door opening 31 which extends from the upper to the lower edge of the intermediate section 11 and which as previously stated constitutes the discontinuity in the section 11. It is necessary in order completely to stack the bathroom assembly to increase the internal length and breadth of the intermediate section 11 as described above, since without resilient deformation of the section 11 the internal length and breadth thereof at the upper open face of the section 11 are less than the corresponding external length and breadth of the upper section 12 at the open face thereof i.e. the upper face during the stacking operation.

A shown in FIG. 4, the ports 26, 27 may serve as support feet when the bathroom assembly is in the stacked condition.

The height of the bathroom assembly when in the stacked condition is substantially equal to one third of the height of the assembly when in the assembled condition, the further section 13 and the lower section 10 being in superposed relationship when the assembly is both in the stacked and in the assembled conditions.

As will clearly be appreciated the space occupied by the bathroom assembly when in the stacked condition is considerably less than the space occupied by the assembly when in the assembled condition so that the storage and transportation costs of the assembly can be considerably reduced.

When it is desired to assemble and install the bathroom assembly the superposed lower and further sections 10, 13 together with the upper section 12 are withdrawn from within the intermediate section 11 whereupon the forces maintaining the resilient deformation of the section 11 are released and this section 11 returns to its initial condition. The lower and further sections 10, 13 are then withdrawn from within the inverted upper section 12 and this section 12 is returned to its original non-inverted condition.

As shown in FIG. 1 the intermediate and upper sections 11, 12 are then mounted in superposed relationship on top of the further section 13 which is, of course, still mounted in superposed relationship on top of the lower section 10, the upper portion 29 of the soap tray and grab rail being disposed in alignment with the lower portion 28 thereof and the upper portion 24 of the recess for housing the medicine cabinet being disposed in alignment with the lower portion 20 thereof.

Referring particularly to FIG. 5 the tongue 35 projecting from each flange 34 is located within the groove 33 formed in the adjacent flange 32 as the sections are mounted in the above superposed relationship. The weight of the section or sections above each joint causes the tongue 35 to be forced into the groove 33 so urging the caulking strip 36 in the groove 33 to be partially displaced therefrom between the associated flanges 32, 34 thereby to seal the joint. This displacement of the caulking strip 36 from the groove 33 to seal the joint is further increased on location of the bolts 38 through the holes 37 formed in the flanges 32, 34 and on tightening of the nuts 39 on the bolts 38.

Finally, the connections 42, 43, 48, the connection from the waste outlet from the W.C. bowl 15 and the connection on the warm air duct are coupled to the appropriate services installed in the building, the light and ventilation fittings mounted in the ports 26 and 27, respectively, are connected to the appropriate services installed in the building, and the sliding door is mounted with the rotatable rollers on the roller track, the roller track and the door frame members previously having been secured as hereinbefore described.

If desired the bathroom floor 14 may be carpeted or tiled in the conventional manner.

The second, third and fourth preferred embodiments of the invention are basically of similar form to the first preferred embodiment, as hereinbefore described, but different therefrom in the following respects. For simplicity, like reference numerals have been used in all the figures of the drawings to denote like parts.

Figure 6:
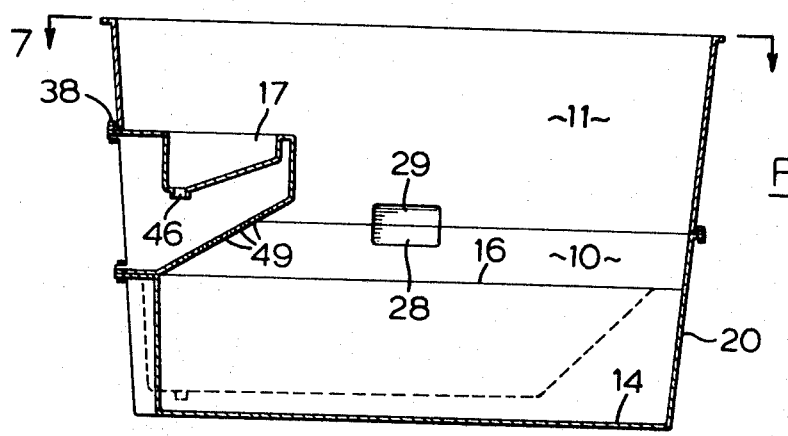
FIG. 6 is a sectioned view of the second embodiment showing the bathroom assembly on the line 6—6 of FIG. 7, the assembly being shown in the assembled condition.
Figure 7:
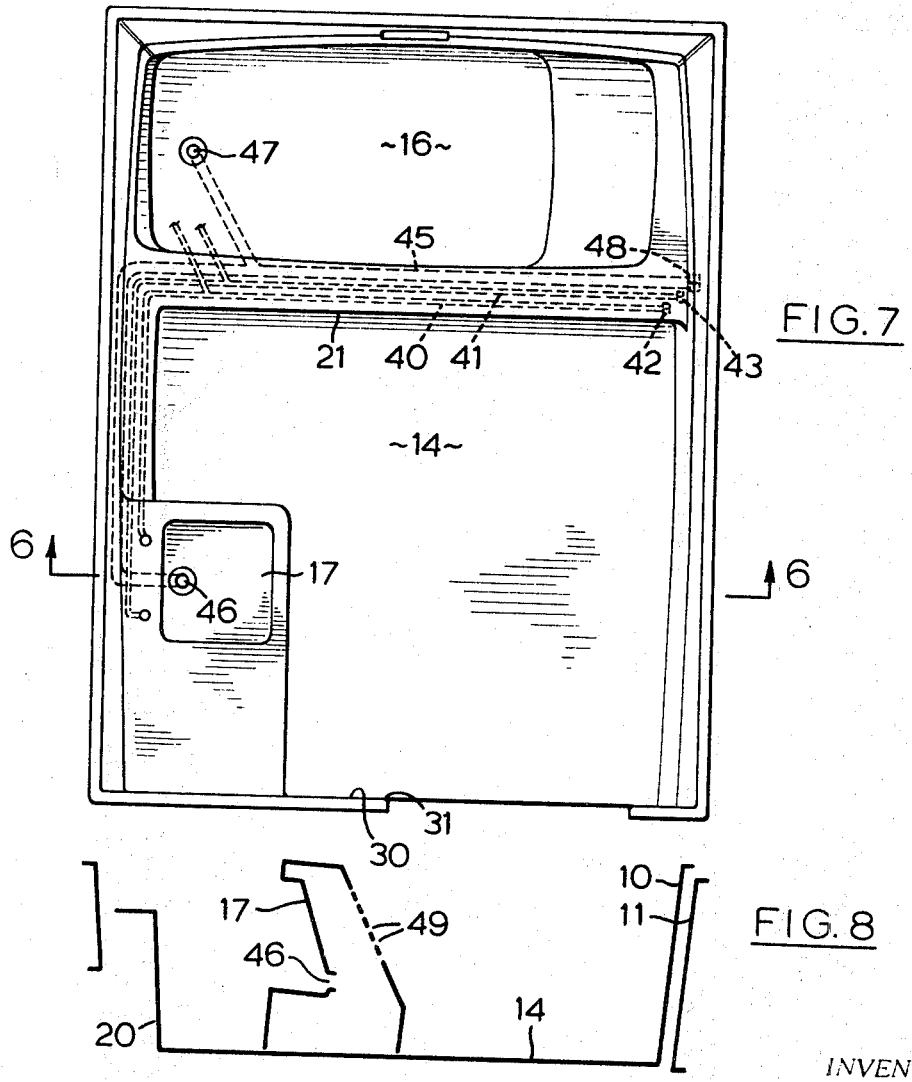
FIG. 7 is a top plan view of the bathroom assembly shown in FIG. 6, on the direction of the arrows 7—7 of FIG. 6.
Figure 8:
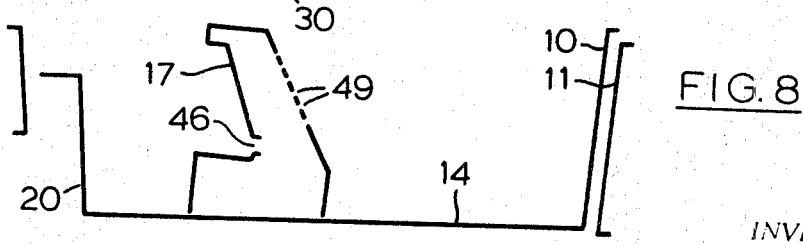
FIG. 8 is a sectioned, diagrammatic view of the bathroom assembly shown in FIG. 6 on the line 6—6 of FIG. 7, the assembly being shown in the stacked condition.

With particular reference to the second preferred embodiment of the invention, as illustrated in FIGS. 6 to 8 inclusive, the respects in which this embodiment differs from the first prefered embodiment are that there are only two sections, namely the lower section 10 and the intermediate section 11. Furthermore, in this second preferred embodiment there is now W.C. bowl corresponding to the W.C. bowl 15 of the first embodiment and the wash hand basin 17, which in the first preferred embodiment is integrally formed with the further section 13 is, in this second embodiment, removably mounted to the sections 10 and 11 although it is to be understood that the basin 17 could alternatively be so mounted only to one of the sections 10, 11, the basin 17 being disposable wholy within the space bounded by the lower section 10 so that, as shown in FIG. 8, when the bathroom assembly is in the stacked condition the basin 17 does not increase the overall dimensions of the stacked assembly.

Since the second preferred embodiment does not include a section corresponding to the upper section 12 of the first embodiment this second embodiment does not, of course, include ports corresponding to the ports 26 and 27 of the first embodiment nor does it include a recess corresponding to the recess constituted by the lower and upper portion 22, 24 of the first embodiment.

Figure 9:
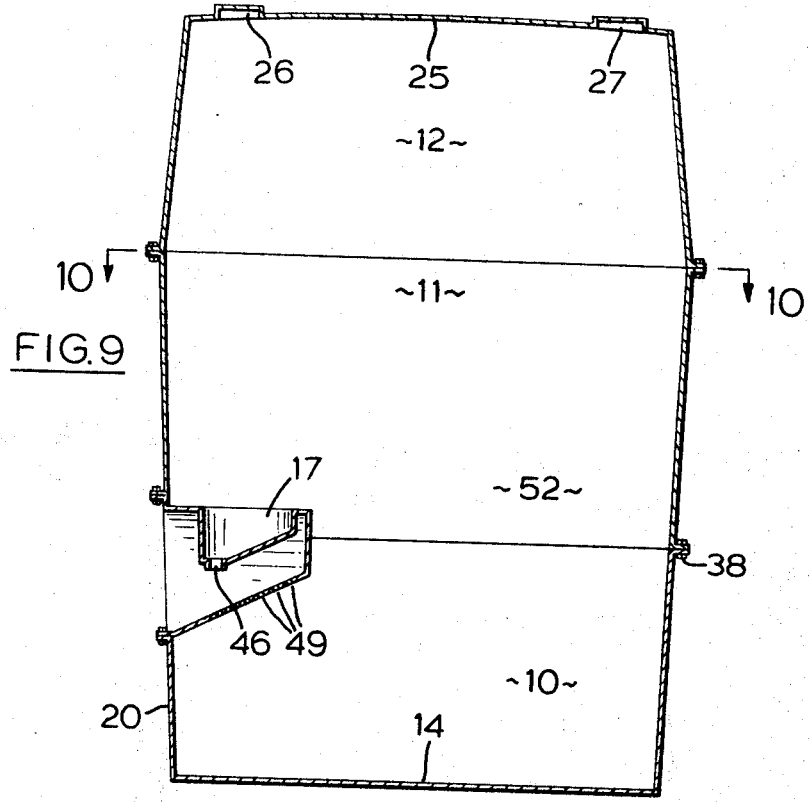
FIG. 9 is a sectioned view of the third embodiment showing the bathroom assembly on the line 9—9 of FIG. 10, the assembly being shown in the assembled condition.
Figure 10:
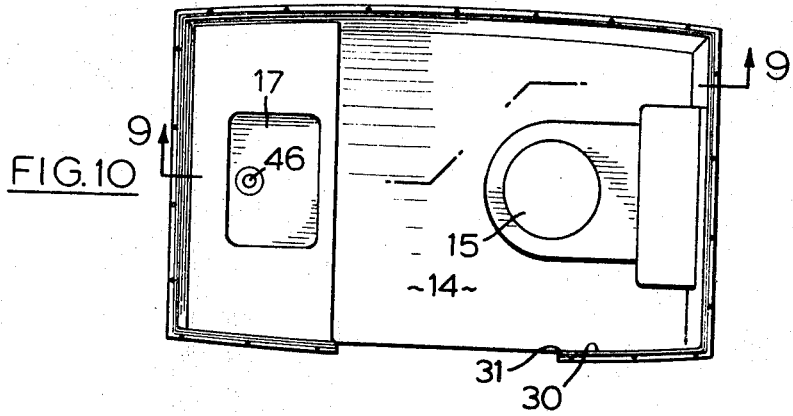
FIG. 10 is a sectioned view of the bathroom assembly shown in FIG. 9, on the line 10—10 of FIG. 9.
Figure 11:
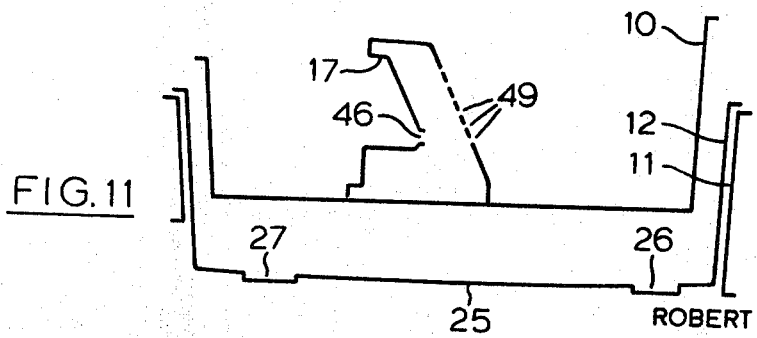
FIG. 11 is a sectioned, diagrammatic view of the bathroom assembly shown in FIG. 9 on the line 9—9 of FIG. 10, the assembly being shown in the stacked condition.

Referring now to the third preferred embodiment of the invention, as illustrated in FIGS. 9 to 11 inclusive, there is no section corresponding to the further section 13 of the first embodiment.

Furthermore, the third embodiment does not include a bath tub corresponding to the bath tub 16 of the first embodiment nor does it include either a wall of hollow construction corresponding to the wall 21 of the first embodiment or, of course, service piping corresponding to the service piping 40, 41, 45 located within this wall of hollow construction. Furthermore, as in the case of the second preferred embodiment, the third preferred embodiment does not include a recess corresponding to the recess constituted by the lower and upper portions 22, 24 of the first embodiment and the wash hand basin 17 is again removably mounted to the sections 10 and 11 although it may be so mounted only to one of the sections 10, 11. As in the second embodiment the basin 17 in the third embodiment is disposable wholly within the space bounded by the lower section 10 when the bathroom assembly is in the stacked condition as shown in FIG. 11.

Figure 12:
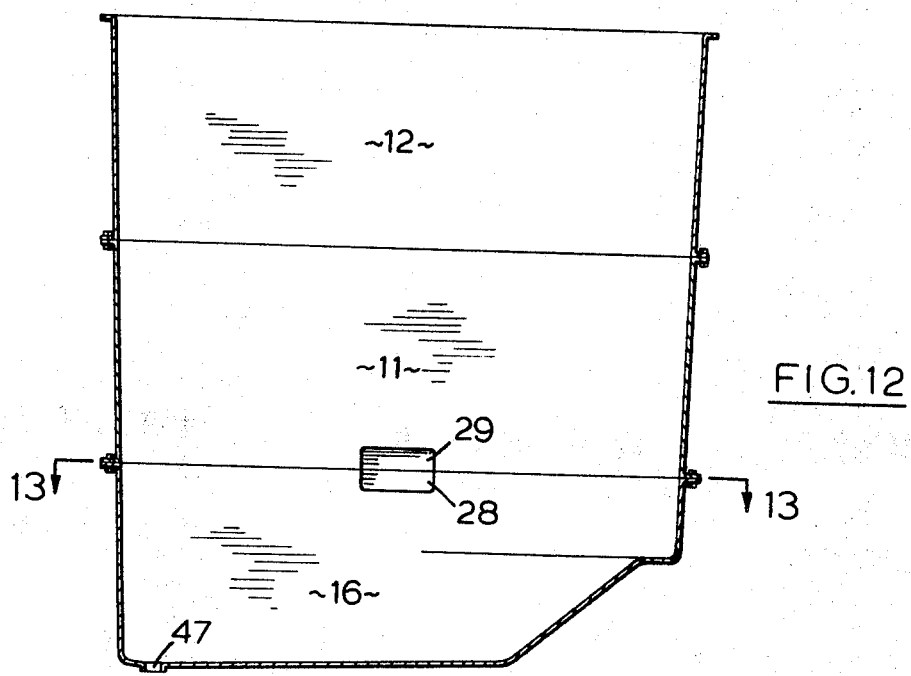
FIG. 12 is a sectioned view of the fourth embodiment showing the bathroom assembly on the line 12—12 of FIG. 13, the assembly being shown in the assembled condition.
Figure 13:
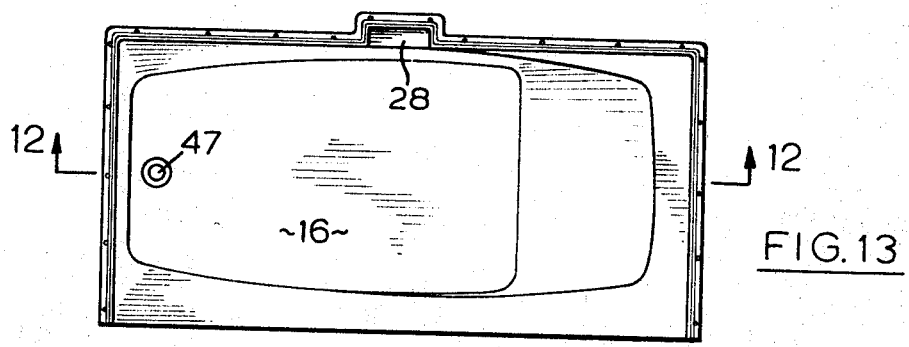
FIG. 13 is a sectioned view of the bathroom assembly shown in FIG. 12, on the line 13—13 of FIG. 12.
Figure 14:
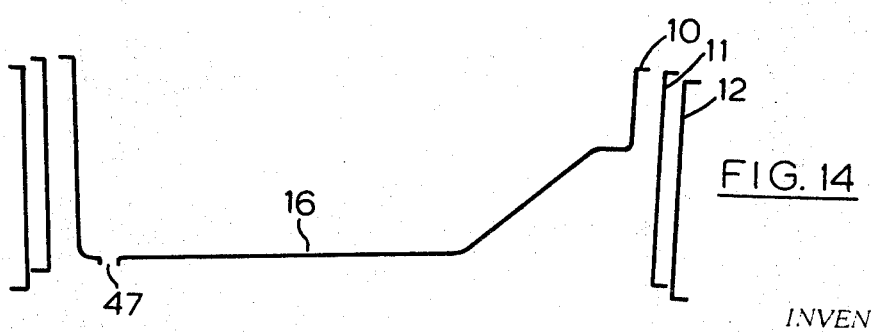
FIG. 14 is a sectioned, diagrammatic view of the bathroom assembly shown in FIG. 12 on the line 12—12 of FIG. 13, the assembly being shown in the stacked condition.

Referring, finally, to the fourth preferred embodiment as shown in FIGS. 12 to 14 inclusive, thre are three sections, namely the lower section 10, the intermediate section 11, and the upper section 12, although it is to be understood that the intermediate and upper sections 11, 12, respectively, may be constituted by a single section. In this fourth embodiment the sections 10, 11, 12 include only those parts of the portions of the bathroom walls which are vertically adjacent to the room facility which is included in the lower section 10 and which as shown in FIGS. 12, 13 and 14 is constituted by the bath tub 16. Because of the form of the sections in this fourth preferred embodiment there is, of course, no specific opening which corresponds to the door opening 31 of the first embodiment; in this fourth embodiment the discontinuity in the section 11 is constituted by the open side of this section. Furthermore, the upper section 12 does not include a bathroom ceiling corresponding to the ceiling 25 of the first embodiment and hence does not include ports corresponding to the ports 26 and 27. Again, as in the case of the second and third embodiments, the fourth embodiment does not include a recess corresponding to the recess constituted by the lower and upper portions 22, 24, respectively, of the first embodiment.

In this fourth embodiment the intermediate and upper sections 11, 12, respectively, are disposed, when the bathroom assembly is in the stacked condition as shown in FIG. 14, with the intermediate section 11 around the lower section 10 and with the upper section 12 around the intermediate section 11. The section 12 thus constitutes, in effect, a second intermediate section, the discontinuity in which is constituted, as in the case of the intermediate section 11, by the open side of the section.

As will be clear, in the second, third and fourth preferred embodiments the joints between adjacent sections may be constituted by the form of joint illustrated in FIG. 5 and described with reference to the first embodiment.

While four preferred embodiments have hereinbefore been described and have been illustrated in the accompanying drawings the various features included in the preferred embodiments are in no way specific to the particular embodiments in relation to which they have been illustrated and described but may, on the contrary, be included in one or more of the other embodiments. Solely by way of example, the wash hand basin 17 in the first preferred embodiment may, instead of being integrally formed with the further section 13, be removably mounted thereto and be disposable wholly within the space bounded by the lower section 10 when the bathroom assembly is in the stacked condition, as in the case of the second and third embodiments.

While the preferred embodiments hereinbefore specifically described with reference to the accompanying drawings are all bathroom assemblies it will be understood that the scope of the invention is not restricted to bathroom assemblies but includes all room assemblies, such as kitchen and sauna bath assemblies, within the scope of the appended claims.

What I claim as my invention is:

1. A stackable, pre-fabricated room assembly comprising at least two sections one of which constitutes a lower section, the sections being adapted to be assembled in superposed relationship, wherein at least one of the sections includes a room facility integrally formed therewith, at least one of the sections, other than the lower section is discontinuous and is of open-ended resiliently deformable construction, and at least one of the remaining sections including the lower section, has external dimensions which exceed the corresponding internal dimensions of the discontinuous section or sections when not resiliently deformed, said internal dimensions of the discontinuous section or sections being capable of being increased by resilient deformation of the discontinuous section or sections for disposal thereof around the remaining section or sections when all the sections are in the stacked condition.

2. A stackable, pre-fabricated room assembly comprising at least four sections consisting of a lower section, at least one intermediate section, an upper section, and at least one further section, the sections each being of integral construction, the lower, intermediate and upper sections being adapted to be assembled in superposed relationship, and the further section and one of the sections consisting of the lower, intermediate, and upper sections being disposed in superposed relationship and having a combined height substantially equal to the height of each of the remaining sections, in which the lower section includes the floor of the room, at least one room facility and the lower portions of the walls of the room, and the upper section includes the ceiling and the upper portions of the walls of the room, the internal dimensions of the upper section relative to the corresponding external dimensions of the lower section being such that the lower section may be disposed within the upper section with the upper section in the inverted condition, a vertically disposed door opening being formed in one of the walls of the room, and traversing the full height of the intermediate and said further sections so that the intermediate section or sections are of open-ended, discontinuous construction, the intermediate section or sections being resiliently deformable, the upper section having external dimensions which exceed the corresponding internal dimensions of the discontinuous intermediate section or sections when not resiliently deformed, said internal dimensions of the discontinuous intermediate section or sections being capable of being increased by resilient deformation of the discontinuous intermediate section or sections for disposal thereof around the upper section with the lower and upper sections in the stacked condition, and the further section being of such dimensions or form that it may be disposed in the same manner as the section with which it is in superposed relationship.

3. A room assembly according to claim 2, wherein the assembly is a bathroom assembly; and wherein said at least one room facility includes a wall of hollow construction disposed between opposed portions of the bathroom walls, and service piping is located within said wall of hollow construction.

4. A room assembly according to claim 2, wherein at least one opening is provided in at least one of the sections, a removable panel or panels covering said at least one opening.

5. A room assembly according to claim 2, wherein a joint is provided between adjacent edges of adjacent ones of the sections, the joint being constituted by a tongue projecting from one of said adjacent edges and a mating groove formed in the other of said adjacent edges.

6. A room assembly according to claim 5, wherein a caulking strip is provided between the tongue and the groove.

7. A room assembly according to claim 5, wherein the tongue projects in an upward direction from said one of said adjacent edges when said adjacent ones of the sections are in the assembled condition.

8. A room assembly according to claim 2, wherein at least one further room facility is adapted to be removably mounted to at least one of the sections, said further room facility being disposable within the space bounded by the lower section.

9. A room assembly according to claim 8, wherein the assembly is a bathroom assembly, and said further room facility is constituted by a wash hand basin.

10. A stackable, pre-fabricated room assembly comprising at least two sections one of which constitutes a lower section, the sections each being of integral construction and being adapted to be assembled in superposed relationship, in which the lower section includes the floor of the room, at least one room facility and the lower portions of the walls of the room, and the remaining section or sections include portions of the walls of the room above said lower portions thereof, a vertically disposed door opening being formed in one of the walls of the room and traversing the full height of said remaining section or sections so that said remaining section or sections are of open-ended, discontinuous construction, said remaining section or sections also being resiliently deformable, the lower section having external dimensions which exceed the corresponding internal dimensions of the discontinuous section or sections when not resiliently deformed, and said internal dimensions of the discontinuous section or sections being capable of being increased by resilient deformation of the discontinuous section or sections for disposal thereof around the lower section when all the sections are in the stacked condition.

11. A room assembly according to claim 10, wherein the assembly is a bathroom assembly; and wherein said at least one room facility includes a wall of hollow construction disposed between opposed portions of the bathroom walls, and service piping is located within said wall of hollow construction.

12. A room assembly according to claim 10, wherein a joint is provided between adjacent edges of adjacent ones of the sections, the joint being constituted by a tongue projecting from one of said adjacent edges and a mating groove formed in the other of said adjacent edges.

13. A stackable, pre-fabricated room assembly comprising at least three sections consisting of a lower section, at least one intermediate section, and an upper section, the sections each being of integral construction and being adapted to be assembled in superposed relationship, in which the lower section includes the floor of the room, at least one room facility and the lower portions of the walls of the room, and the upper section includes the ceiling and the upper portions of the walls of the room, the internal dimensions of the upper section relative to the corresponding external dimensions of the lower section being such that the lower section may be disposed within the upper section with the upper section in the inverted condition, and a vertically disposed door opening being formed in one of the walls of the room, and traversing the full height of the intermediate section or sections so that the intermediate section or sections are of open-ended, discontinuous construction, said intermediate section or sections also being resiliently deformable, the upper section having external dimensions which exceed the corresponding internal dimensions of the discontinuous intermediate section or sections when not resiliently deformed, and said internal dimensions of the discontinuous intermediate section or sections being capable of being increased by resilient deformation of the discontinuous intermediate section or sections for disposal thereof around the upper section with the lower and upper sections in the stacked condition.

14. A room assembly according to claim 13, wherein the assembly is a bathroom assembly; and wherein said at least one room facility includes a wall of hollow construction disposed between opposed portions of the bathroom walls, and service piping is located within said wall of hollow construction.

15. A room assembly according to claim 13, wherein at least one opening is provided in at least one of the sections, a removable panel or panels covering said at least one opening.

16. A room assembly according to claim 13, wherein a joint is provided between adjacent edges of adjacent ones of the sections, the joint being constituted by a tongue projecting from one of said adjacent edges and a mating groove formed in the other of said adjacent edges.

17. A room assembly according to claim 16, wherein a caulking strip is provided between the tongue and the groove.

18. A room assembly according to claim 16, wherein the tongue projects in an upward direction from said one of said adjacent edges when said adjacent ones of the sections are in the assembled condition.

19. A room assembly according to claim 13, wherein at least one further room facility is adapted to be removably mounted to at least one of the sections, said further room facility being disposable wholly within the space bounded by the lower section.

20. A room assembly according to claim 19, wherein the assembly is a bathroom assembly, and said further room facility is constituted by a wash hand basin.

21. A room assembly according to claim 13, wherein, of the sections, at least the intermediate section or sections are of molded fibreglass construction.

22. A stackable, pre-fabricated room assembly comprising at least two sections one of which constitutes a lower section, the sections each being of integral construction and being adapted to be assembled in superposed relationship, in which the lower section includes at least one room facility and the remaining section or sections are of discontinuous, open-ended construction and include those parts of portions of the walls of the room adjacent to said room facility, said remaining section or sections being resiliently deformable, the lower section having external dimensions which exceed the corresponding internal dimensions of the discontinuous section or sections when not resiliently deformed, and said internal dimensions of the discontinuous section or sections being capable of being increased by resilient deformation of the discontinuous section or sections for disposal thereof around the lower section when all the sections are in the stacked condition.

References Cited

UNITED STATES PATENTS

| | | | |
|---|---|---|---|
| 2,087,121 | 7/1937 | Samelow | 52—34 |
| 2,220,482 | 11/1940 | Fuller | 52—34 |
| 3,110,907 | 11/1963 | King | 52—79 |
| 3,224,155 | 12/1965 | Rook | 52—593 |
| 3,382,635 | 5/1968 | O'Gara | 4—146 X |
| 2,922,563 | 1/1960 | Aldington | 206—65 X |

JOHN E. MURTAGH, Primary Examiner

U.S. Cl. X.R.

4—116; 52—173, 220, 270, 309